United States Patent
Steely, Jr. et al.

(10) Patent No.: US 7,409,500 B2
(45) Date of Patent: *Aug. 5, 2008

(54) SYSTEMS AND METHODS FOR EMPLOYING SPECULATIVE FILLS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/755,938

(22) Filed: Jan. 13, 2004

(65) Prior Publication Data

US 2005/0154805 A1     Jul. 14, 2005

(51) Int. Cl.
G06F 9/00 (2006.01)
G06F 9/38 (2006.01)
G06F 13/00 (2006.01)

(52) U.S. Cl. ............... 711/119; 711/118; 711/117; 711/146; 711/141; 711/100; 712/217; 712/216; 712/1

(58) Field of Classification Search ............ None
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A * | 4/2000 | Sharma et al. | 711/130 |
| 6,081,887 A | 6/2000 | Steely, Jr. et al. | |
| 6,085,263 A | 7/2000 | Sharma et al. | |
| 6,088,769 A * | 7/2000 | Luick et al. | 711/141 |
| 6,108,737 A | 8/2000 | Sharma et al. | |
| 6,134,646 A | 10/2000 | Feiste et al. | |

(Continued)

OTHER PUBLICATIONS

Vijaykumar et al. "Speculative Versioning Cache", IEEE Transactions on Parallel and Distributed Systems, vol. 12, Issue 12, Dec. 2001 pp. 1305-1317.*

(Continued)

*Primary Examiner*—Sanjiv Shah
*Assistant Examiner*—Samuel Dillon

(57) ABSTRACT

Multi-processor systems and methods are disclosed. One embodiment may comprise a multi-processor system with a processor having a processor pipeline that executes program instructions with data from speculative data fills that are provided in response to source requests. The multi-processor system may comprise a first cache that retains cache data associated with program instructions employing data from speculative data fills, and a second cache that retains cache data associated with data from speculative data fills that have been determined to be coherent.

40 Claims, 9 Drawing Sheets

U.S. PATENT DOCUMENTS

| | | | |
|---|---|---|---|
| 6,151,671 | A | 11/2000 | D'Sa et al. |
| 6,209,065 | B1 | 3/2001 | Van Doren et al. |
| 6,275,905 | B1 * | 8/2001 | Keller et al. ............ 711/141 |
| 6,286,090 | B1 | 9/2001 | Steely, Jr. et al. |
| 6,301,654 | B1 | 10/2001 | Ronchetti et al. |
| 6,317,811 | B1 | 11/2001 | Deshpande et al. |
| 6,345,342 | B1 | 2/2002 | Arimilli et al. |
| 6,349,382 | B1 | 2/2002 | Feiste et al. |
| 6,356,918 | B1 | 3/2002 | Chuang et al. |
| 6,408,363 | B1 | 6/2002 | Lesartre et al. |
| 6,412,067 | B1 | 6/2002 | Ramirez et al. |
| 6,457,101 | B1 | 9/2002 | Bauman et al. |
| 6,493,802 | B1 * | 12/2002 | Razdan et al. ............ 711/144 |
| 6,535,941 | B1 | 3/2003 | Kruse |
| 6,553,480 | B1 | 4/2003 | Cheong et al. |
| 6,574,712 | B1 | 6/2003 | Kahle et al. |
| 6,591,348 | B1 | 7/2003 | Deshpande et al. |
| 6,594,821 | B1 | 7/2003 | Banning et al. |
| 6,615,343 | B1 | 9/2003 | Talcott et al. |
| 6,633,960 | B1 | 10/2003 | Kessler et al. |
| 6,633,970 | B1 * | 10/2003 | Clift et al. ............ 712/217 |
| 6,651,143 | B2 | 11/2003 | Mounes-Toussi |
| 6,775,749 | B1 * | 8/2004 | Mudgett et al. ............ 711/146 |
| 7,234,029 | B2 * | 6/2007 | Khare et al. ............ 711/146 |
| 2001/0055277 | A1 | 12/2001 | Steely, Jr. et al. |
| 2002/0009095 | A1 | 1/2002 | Van Doren et al. |
| 2002/0099833 | A1 | 7/2002 | Steely, Jr. et al. |
| 2002/0099913 | A1 | 7/2002 | Steely, Jr. |
| 2002/0146022 | A1 | 10/2002 | Van Doren et al. |
| 2002/0194290 | A1 | 12/2002 | Steely, Jr. et al. |
| 2002/0194436 | A1 | 12/2002 | McKenney |
| 2002/0199067 | A1 * | 12/2002 | Patel et al. ............ 711/145 |
| 2003/0069902 | A1 | 4/2003 | Narang et al. |
| 2003/0145136 | A1 | 7/2003 | Tierney et al. |
| 2003/0195939 | A1 | 10/2003 | Edirisooriya et al. |

OTHER PUBLICATIONS

Intel, "An Overview of Cache", Dec. 21, 1996, http://www.intel.com/design/intarch/papers/cache6.pdf.*

Huh et al., Speculative Incoherent Cache Protocols. IEEE Micro 24(6): 104-109 (2004).*

D. Lenoski et al. The Stanford Dash Multiprocessor. IEEE Computer, pp. 63-79, Mar. 1992.*

L. Kontothanassis and M. Scott, "High Performance Software Coherence for Current and Future Architectures," Journal for Parallel and Distributed Computing, 1995.*

Chen, M. and Olukotun, K. TEST: A Tracer for Extracting Speculative Threads. In CGO'03, San Francisco, CA, Mar. 2003.*

M. Lipasti, C. Wilkerson, and J. Shen. Value locality and load value prediction. In Proceedings of the 7th ASPLOS, Boston, MA, Oct. 1996.*

Trung A. Diep, Christopher Nelson, John Paul Shen, Performance evaluation of the PowerPC 620 microarchitecture, Proceedings of the 22nd annual international symposium on Computer architecture, p. 163-174, Jun. 22-24, 1995, S. Margherita Ligure, Italy.*

M. Cintra, J. F. Martnez, and J. Torrellas. Architectural support for scalable speculative parallelization in shared-memory multiprocessors. In Proceedings of the 27th Annual International Symposium on Computer Architecture, Jun. 2000.*

Sato, T.; Ohno, K.; Nakashima, H., "A mechanism for speculative memory accesses following synchronizing operations," Parallel and Distributed Processing Symposium, 2000. IPDPS 2000. Proceedings. 14th International 2000.*

Gupta, R. 1989. The fuzzy barrier: a mechanism for high speed synchronization of processors. In Proceedings of the Third international Conference on Architectural Support For Programming Languages and Operating Systems (Boston, Massachusetts, United States, Apr. 3-6, 1989). ASPLOS-III. ACM Press, New York, NY.*

Kozyrakis. Vector IRAM: ISA and Micro-architecture. IEEE Computer Elements Workshop, Vail, CO, Jun. 21-24, 1998.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

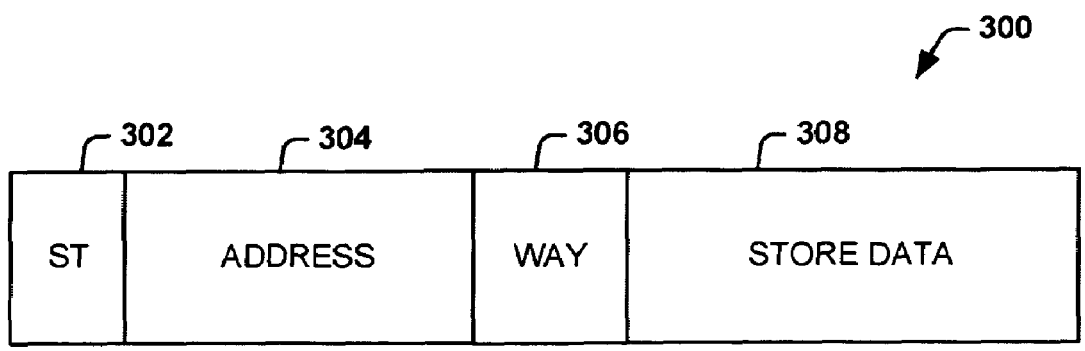
FIG. 9
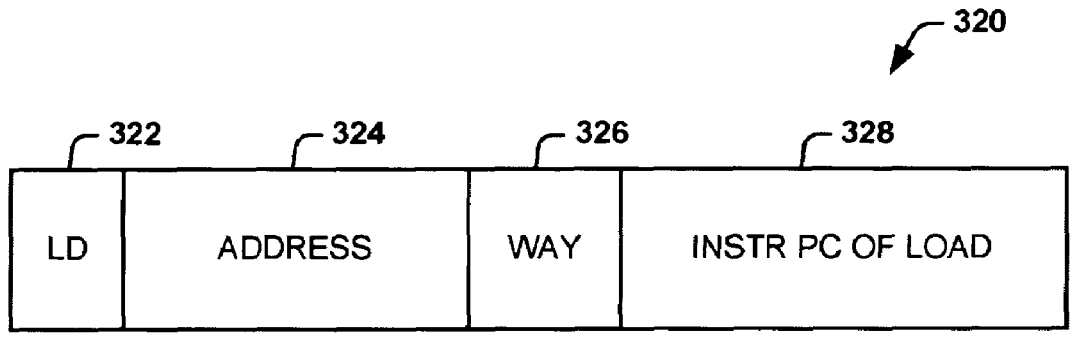
FIG. 10
| LD | ADDRESS | WAY | INSTR PC OF LOAD |
|----|---------|-----|------------------|
| LD | ADDRESS | WAY | INSTR PC OF LOAD |
| ST | ADDRESS | WAY | STORE DATA |
| LD | ADDRESS | WAY | INSTR PC OF LOAD |
| ST | ADDRESS | WAY | STORE DATA |
| ST | ADDRESS | WAY | STORE DATA |
| LD | ADDRESS | WAY | INSTR PC OF LOAD |
CACHE LOG INDEX →
FIG. 11

SYSTEMS AND METHODS FOR EMPLOYING SPECULATIVE FILLS

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "MULTI-PROCESSOR SYSTEMS AND METHODS FOR BACKUP FOR NON-COHERENT SPECULATIVE FILLS," application Ser. No. 10/756,637; "CACHE SYSTEMS AND METHODS FOR EMPLOYING SPECULATIVE FILLS," application Ser. No. 10/756,638; "REGISTER FILE SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "CONSISTENCY EVALUATION OF PROGRAM EXECUTION ACROSS AT LEAST ONE MEMORY BARRIER," application Ser. No. 10/755,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Multi-processor systems are also designed to assure memory consistency associated with memory reference operation ordering. Sequential memory consistency models require the memory reference operations of a process to appear to the rest of the system to execute in program order, even though much of the execution of the program can occur in parallel. The sequential consistency model imposes severe restrictions on the outstanding accesses that a process may have and effectively prohibits many hardware optimizations that could increase performance. A relaxed consistency model attempts to relax the constraints on the allowable event orderings, while still providing a reasonable programming model for the programmer. In a relaxed constancy model, an order is imposed between selected sets of memory reference operations, while other operations are considered unordered. One or more memory barrier or fences instructions are used to indicate the required order. However, no order is required between reference instructions that are not separated by a memory barrier or fence.

SUMMARY

One embodiment of the present invention may comprise a multi-processor system. The multi-processor system may comprise a processor having a processor pipeline that executes program instructions with data from speculative data fills that are provided in response to source requests. The multi-processor system may comprise a first cache that retains cache data associated with program instructions employing data from speculative data fills, and a second cache that retains cache data associated with data from speculative data fills that have been determined to be coherent.

Another embodiment of the present invention may comprise a processor in a multi-processor system. The processor may comprise a processor pipeline that executes program instructions with a speculative data fill that is received in response to a source request. The processor may further comprise a cache system comprising a speculative cache and a retire-time cache. The processor pipeline may read and write cache data to the speculative cache. The processor may further comprise a log that retains executed store entries and executed load entries associated with reading and writing cache data to the speculative cache, and a cache control that updates the retire-time cache with data associated with the executed store entries when the speculative data fill is determined to be coherent.

Another embodiment of the present invention may comprise a multi-processor system that employs a cache coherency protocol. The multi-processor system may comprise means for executing program instructions associated with a source processor employing speculative data fills received in response to a source request, means for retaining cache data associated with the executed program instructions and means for storing executed program instruction entries associated with executed program instructions. The multi-processor system may further comprise means for retiring the executed program instruction entries if a speculative data fill associated with the executed program instruction entry is determined to be coherent and a cache line associated with the speculative data fill has been determined not to have been invalidated upon resolving the coherency associated with the speculative data fill, and means for retaining cache data associated with retired executed program instructions.

Another embodiment may relate to a method of executing program instructions employing a speculative data fill in a multi-processor system. The method may comprise executing program instructions with data from at least one speculative data fill that is provided in response to a source request, storing executed store entries and executed load entries in a log associated with the executed program instructions, retiring executed store entries from the log, if data from the speculative data fill associated with the executed store entries has been determined to be coherent, and retiring executed load entries from the log, if data from the speculative data fill associated with the executed load entries has been determined to be coherent and valid.

BRIEF DESCRIPTION OF THE DRAWINGS

FIG. 9 illustrates an executed store entry.

FIG. 10 illustrates an executed load entry.

FIG. 11 illustrates a log associated with a cache system.

DETAILED DESCRIPTION

Figure 1:
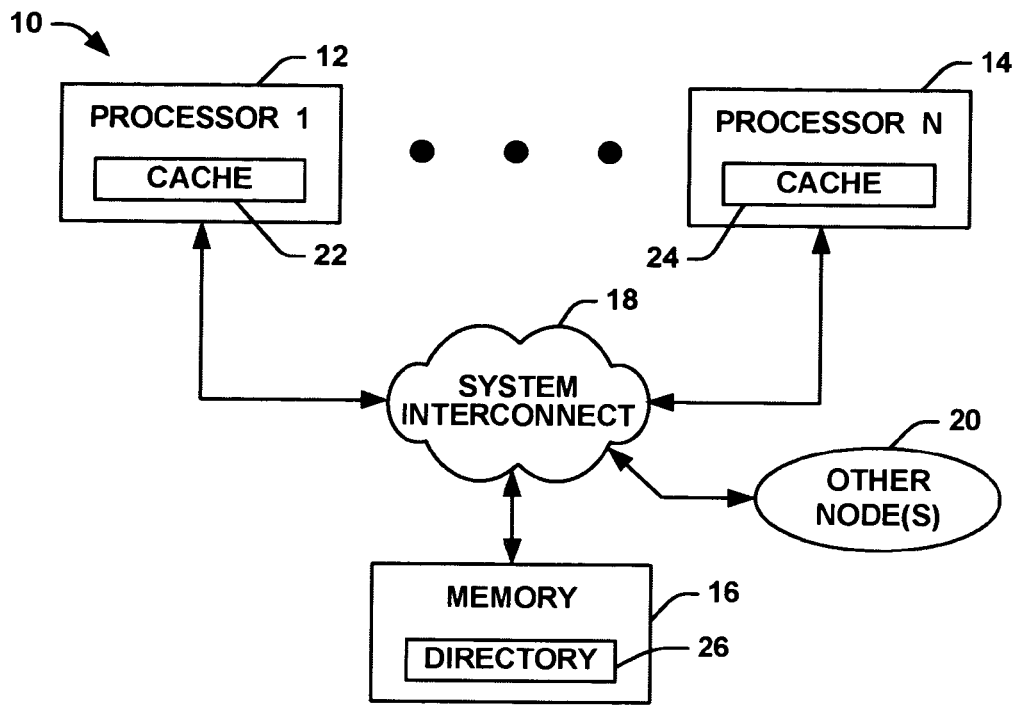
FIG. 1 depicts an example of a multiprocessor system.

This disclosure relates generally to systems and methods for processor speculation and backup in a multi-processor system. A source processor employs a speculative data fill in response to source request. A source request is a request for data associated with a cache line from the multi-processor system. The source request will be generated in response to a processor load or store instruction that experiences a cache miss, such that the requested memory block or data fill associated with a cache line does not reside in the processor's local cache. A data fill refers to a copy of a memory block associated with a given cache line. The source processor can employ one or more speculative data fills or copies of the requested data to continue execution of program instructions.

The systems and methods maintain memory coherency by including a cache system that provides for backup to a backup point (e.g., a first user program instruction address) if an executed program instruction has been determined to be executed with a non-coherent speculative data fill. The systems and methods maintain memory consistency by including a cache system that provides for backup to a backup point (e.g., load program instruction address) if an executed load instruction has been invalidated prior to retire time. If a cache line has been invalidated prior to retire time, the cache line has been modified by another processor in the system. Providing for backup in the event of an executed load instruction that is determined to be invalidated prior to retire time allows a processor to execute past memory barriers with speculative data fills, while still preserving memory consistency of the multi-processor system.

Retire time for a given executed program instruction occurs when a coherent fill is returned from the multi-processor system, such that the coherency of the executed program instruction is resolved. Speculative execution of program instruction (e.g., employing speculative data fills) may be several thousand instructions ahead of an executed load instruction at retire time. Furthermore, the cache line associated with the speculative data fill employed may be invalidated by a system probe prior to retire time of an executed load instruction. Once the coherent fill is returned, the source processor can continue retiring a respective executed program instruction if the speculative data fill is the same as the coherent fill or backup and re-execute program instructions if the speculative data fill is different from the coherent fill. Proper retirement of an executed instruction occurs if all prior load and stores have been retired and any fill initiated by a source request is coherent and has not been invalidated.

The systems and methods can operate in a multi-processor communication system that employ a coherent signal that is a separate indicator from a data fill associated with a response to a source request. The coherent signal indicates which of one or more copies of a data fill returned in response to a source request is a coherent copy of the data. A coherent copy of data is a copy that is determined to be the latest or most up to date version in the system.

FIG. 1 depicts an example of a system 10 that can employ speculative data fills and backup to facilitate processor execution speed. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 can also return a coherent signal indicating that the coherent data fill is the coherent copy of the requested cache line. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative data fill. A speculative data fill is a data fill that may or may not be the latest version of the memory block. Speculative data fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks. The speculative data fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative data fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative data fill employed by the processor to continue execution is the same as the coherent data fill. If the coherent data fill is different from the speculative data fill, the processor can back up and re-execute program instructions with the new data. If the coherent data fill is the same as the speculative data fill, the processor can continue execution, thus mitigating latency caused by the processor remaining in an idle state until a coherent version of the requested memory block is received. The source then backs up and begins executing again with the new data, but loses little or no time from the execution of the speculative data fill as the source would have remained latent during the retrieval of the coherent copy regardless. The cache coherency protocol can continue executing after the coherent copy is retrieved to change states of one or more copies of the memory block in the system based on the request (e.g., read, write) of the source.

Information associated with each source request is retained in the event of a processor backup. The source processor includes a cache system that can be set to a cache state and a register file system that can be set to a register file state associated with a processor backup state in the event of execution with a non-coherent speculative data fill. The source processor also stores information associated with the state of the program counter of the processor pipeline at a backup point. The backup point can be a first user program instruction. The first user program instruction is the first instruction that utilizes the data requested from the store or load instruction initiated by the processor pipeline.

Information associated with each executed load instruction is retained in the event of a processor backup as a result that a cache line associated with the executed load instruction has been invalidated prior to retire time. The cache line associated with the speculative data fill employed by the executed load instruction may be invalidated by a system probe prior to retire time. Proper retirement of the executed load instruction occurs if the speculative data fill associated with the executed load instruction has been determined to be coherent and a cache line associated with the speculative data fill has not been invalidated prior to retire time. In the event that the cache line has been invalidated prior to retire time, the processor is backed up to a program instruction associated with the executed load.

Information associated with each executed store instruction is retained, so that data modified in a speculative cache by plural speculative store instructions is not modified by a first data fill returned from the system. The first data fill can be a speculative data fill or a coherent data fill if a speculative data fill is not returned in response to a source request. This information can be in the form of a store merge mask that determines which bytes of the data fill in a speculative cache have been written to by an executed store entry. The store merge mask can include a bit associated with each byte of a cache line. The bit associated with a corresponding byte is set if the byte is changed by a store instruction to the speculative cache. The store merge mask is employed to generate a merged fill to store in the speculative cache, such that data fills that have been written to by an executed store entry are not overwritten by data from the first data fill. The speculative data fill is masked by the store merge mask and the non-masked bytes are written into a speculative cache. Proper retirement of the executed store instruction occurs if the speculative data fill associated with the executed store instruction has been determined to be coherent and data is written to a retire-time cache.

Figure 2:
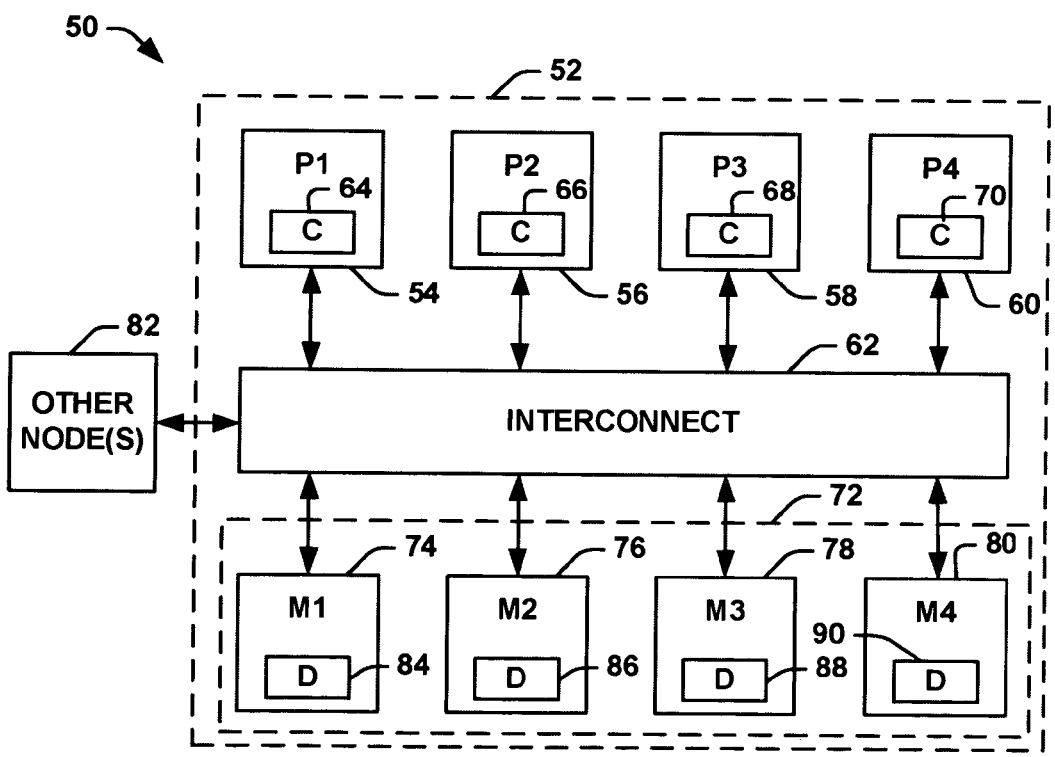
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a directory based protocol in which requests for data are transmitted to a home node, which retains owner information in a directory associated with a given cache line. Alternatively, the cache coherency protocol can be implemented to include a source broadcast protocol in which a request is transmitted to all nodes in the system. Furthermore, a null-based protocol can be employed in which a home node receives a request and issues a source broadcast for the requested data.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 can also return a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative data fills can be provided by a local processor (e.g., within a multi-processor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative data fill used by the source processor to continue execution, the processor can backup and re-execute program instructions. This may be the case if it is determined that a subsequent fill is more likely coherent than the original fill employed by the processor to continue execution.

Each processor retains backup information associated with each source request in the event of a processor backup. Additionally, each processor retains backup information associated with each executed load instruction in the event that it is determined that a cache line associated with the executed load instruction has been invalidated prior to retire time. Each processor includes a cache system and a register file system that can be set to a state associated with a processor backup state in the event of execution with a speculative data fill that is non-coherent, or an executed load instruction that has been provided with speculative data fill data that is associated with a cache line that has been invalidated prior to retire time.

Once a coherent data fill is received in response to a source request, the source processor can determine whether the current speculative data fill employed by the source processor is the same as the coherent data fill to continue retirement of associated executed instructions. If the coherent data fill is different from the speculative data fill, the processor can back up and re-execute program instructions with the new data. The processor can backup its associated pipeline by backing up the program counter to the first user program instruction, setting the cache to a backup point, and setting the register file to a backup point via a backup pointer or index to the register file backup system. Additionally, loaded register files can be reloaded with the coherent fill data.

If the coherent data fill is the same as the speculative data fill, the processor continues retirement of any associated executed load instructions and executed store instructions that employ the speculative data fill. Proper retirement of the executed load instruction occurs if the speculative data fill associated with the executed load instruction has been determined to be coherent and a cache line associated with the speculative data fill has not been invalidated prior to retire time. In the event that the cache line has been invalidated prior to retire time, the processor is backed up to a program instruction associated with the executed load.

In an alternate embodiment, a comparison is performed between bytes of the coherent data fill and the speculative data fill that are employed by the processor pipeline. If none of the bytes employed by the processor pipeline are different between the speculative data fill and the coherent data fill, the coherent data fill is loaded into the local cache and the processor continues retirement of executed load instructions and store instructions. If bytes employed by the processor pipeline are different between the speculative data fill and the coherent data fill, the coherent data fill is loaded into the local cache and a backup to a first user program instruction occurs.

Figure 3:
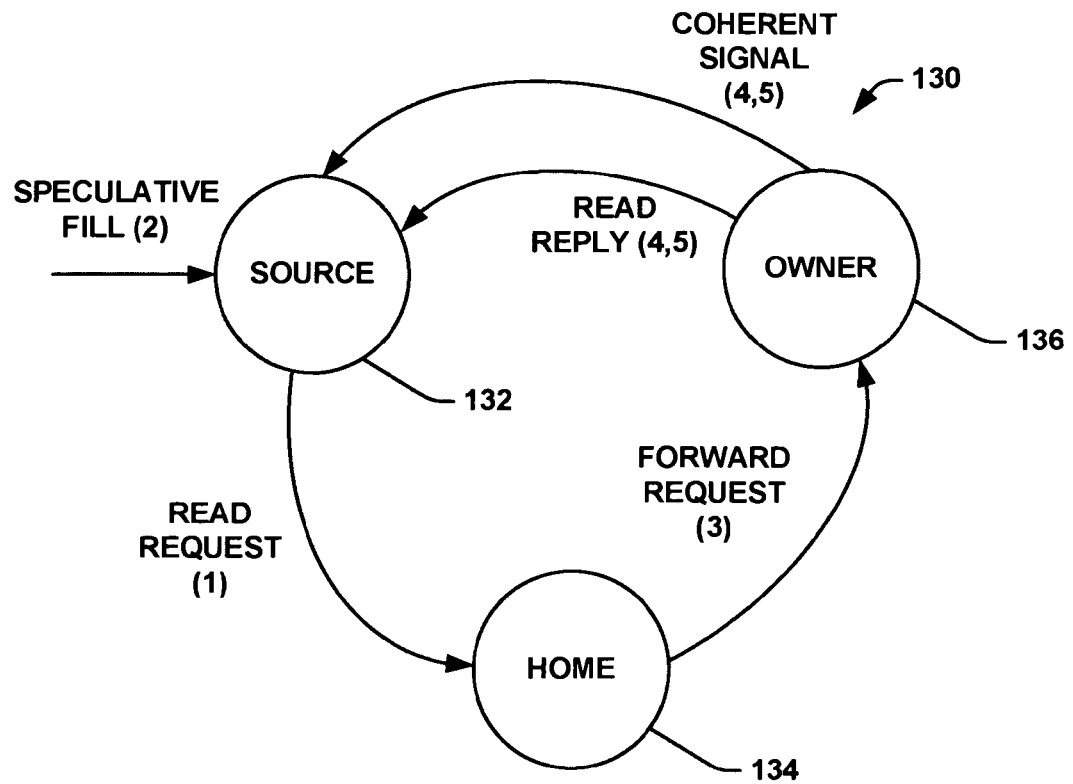
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line. This information is stored in a directory in memory associated with the home node 134. The source read request is also received by one or more other entities and/or structures of the multi-processor system.

For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative data fills, since it is not known at this time whether or not these copies are coherent. One of the speculative data fills are employed by the source processor to continue executing its program instructions. The source processor also retains information to allow the processor pipeline to backup to a previous processor execution state in the event the speculative data fill employed by the processor pipeline is non-coherent.

The multi-processor system continues execution of its cache coherency protocol, while the source processor executes with the speculative data fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g. data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative data fill employed by the source to continue program execution. If the coherent data fill is different from the speculative data fill, the source can back up the program counter to the first user program instruction, set the cache, register files and register map, and reload the registers associated with the requested data to a state associated with the first user program instruction and re-execute program instructions with the new coherent data.

If the coherent data fill is the same as the speculative data fill, the source can continue retiring executed load instructions, which can be several thousand instructions ahead of where the program would be without employing the speculative data fill. Proper retirement of the executed load instruction occurs if the speculative data fill associated with the executed load instruction has been determined to be coherent and a cache line associated with the speculative data fill has not been invalidated prior to retire tine. In the event that the cache line has been invalidated in prior to retire time, the processor is backed up to a program instruction associated with the executed load. Proper retirement of the executed store instruction occurs if the speculative data fill associated with the executed store instruction has been determined to be coherent and data is written to a retire-time cache.

Figure 4:
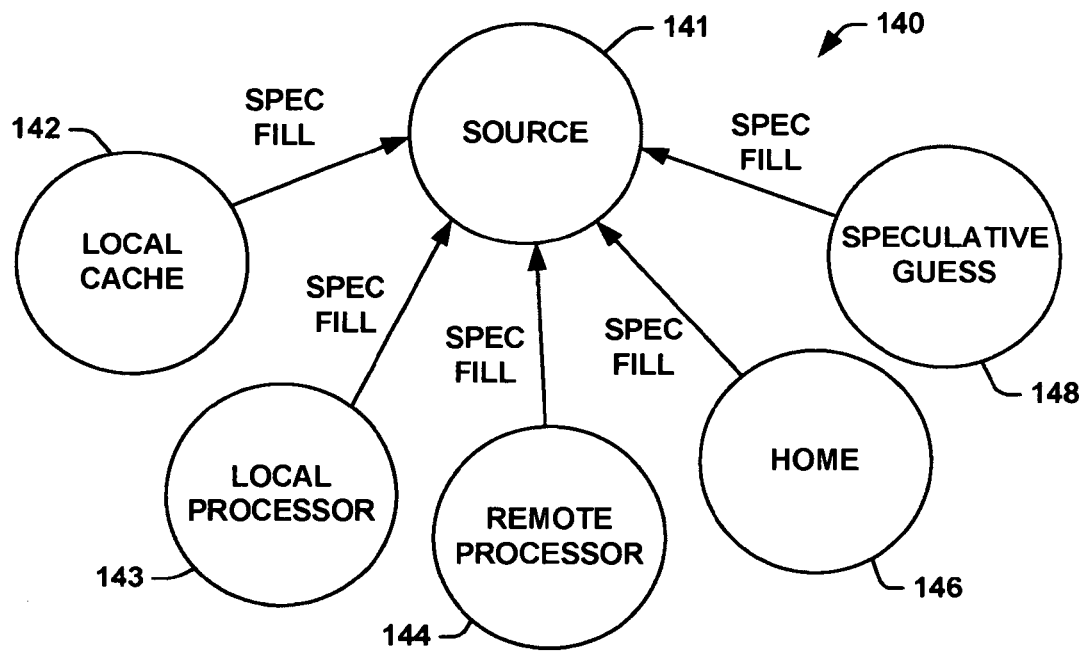
FIG. 4 illustrates a system diagram associated with a source node or processor receiving speculative data fills.

FIG. 4 illustrates a system diagram 140 associated with a source node or processor 141 receiving speculative data fills in response to a source request in the event of a cache miss in a multi-processor system. The source node or processor 141 can receive speculative data fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative data fill. When the upgrade miss returns, a coherent signal will occur if the upgrade occurred to the value that was already present in the cache. If a new value is obtained, the new value will cause the source 141 to backup and re-execute program instruction with the new value.

Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative data fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative data fill to the source. Additionally, a speculative data fill can be provided by a remote processor 144 that can provide a speculative data fill prior to the time necessary in providing the coherent fill. A remote processor is a processor that is not within a node or multi-processor group with the source 141. A home node 146 or processor can also provide a speculative data fill.

The multi-processor system can also include a speculative guess structure 148 operative to provide speculative data fills. For example, the speculative guess structure 148 can be a speculative engine that can be employed to provide speculative data fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative data fills are similar to a substantial portion of the coherent fills transmitted over the system.

Figure 5:
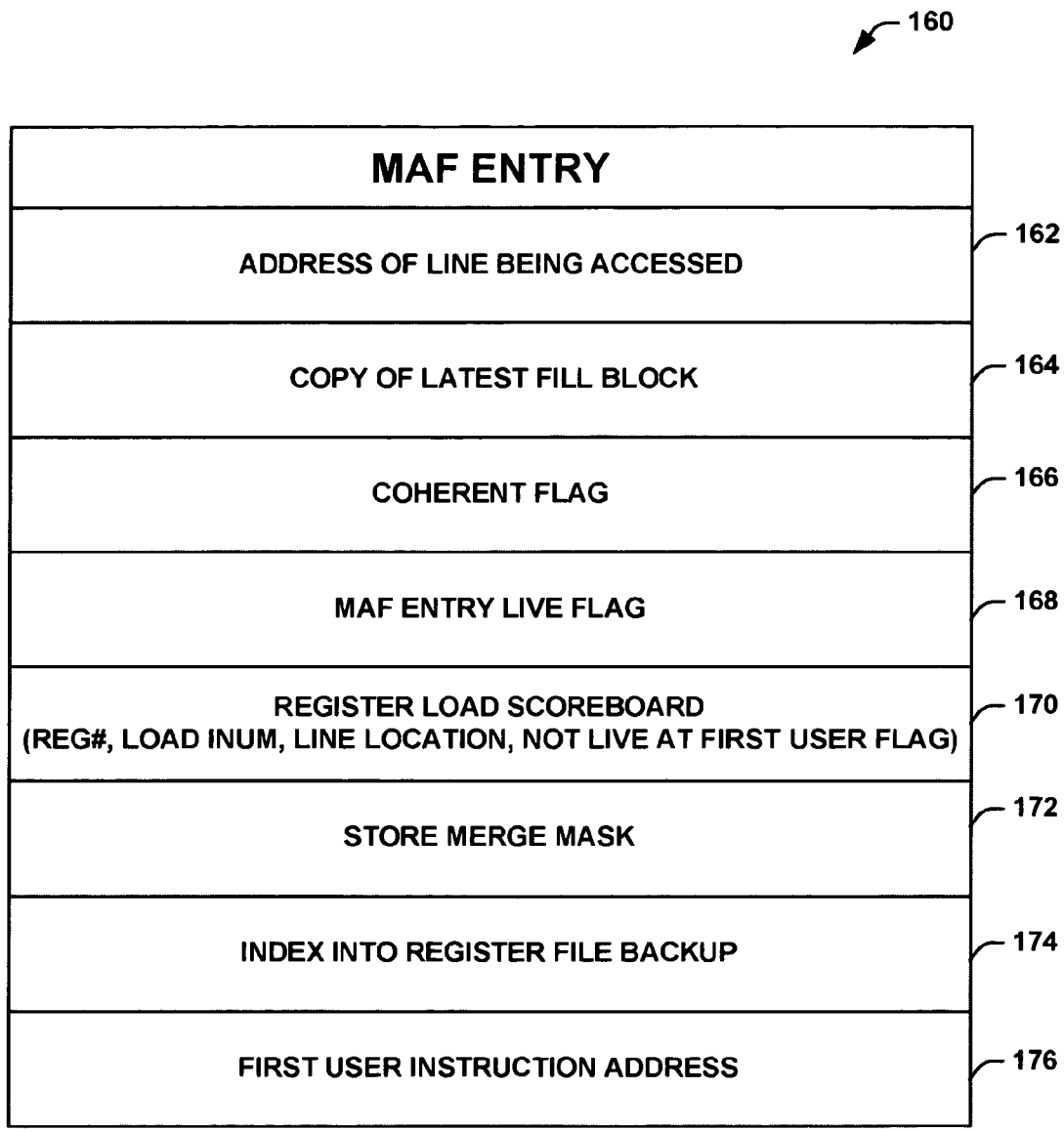
FIG. 5 illustrates a block diagram of a miss address file (MAF) entry.

FIG. 5 illustrates a block diagram of a miss address file (MAF) entry 160 that can be employed to initiate backup of a processor pipeline in the event of execution of a speculative data fill that is not coherent. A MAF entry is generated by a source each time a source request for a new cache line is generated over the system. The MAF entry 160 contains fields associated with an outstanding request corresponding to a cache miss for a respective cache line. The MAF fields can include the cache line address being requested 162, the copy of the latest fill block 164 returned by the system and a coherent flag 166 that provides an indication of whether or not the coherent signal has been received.

The MAF entry 160 also includes fields for initiating a backup of the processor pipeline. The MAF entry 160 includes a MAF entry live flag field 168. The MAF entry live flag 168 indicates that a first user program instruction has been encountered by the processor pipeline. The first user program instruction is the first instruction that employs the requested data. The MAF entry 160 also includes a register load scoreboard 170. The register load scoreboard 170 includes entries for each register that is a destination of a load instruction prior to encountering the first user program instruction and subsequent to an instruction that causes the source request. Each entry in the scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

The MAF entry 160 also includes a store merge mask entry 172. The store merge mask can include a bit associated with each byte of a cache line. The bit associated with a corresponding byte is set if the byte is changed by a store instruction to the speculative cache. The store merge mask is employed to generate a merged fill to store in the speculative cache, such that data fills that have been written to by an executed store entry are not overwritten by data from a first data fill returned by the system in response to a source request.

The MAF entry 160 also includes an index into the register file backup system field 174. This index can be a pointer into a log or a register backup file associated with the state of the register file at a backup point associated with the processor backup state. The MAF entry 160 also includes the address of the first user program instruction field 176. The address of the first user program instruction can be employed to set the program counter to the first user program instruction.

The following program example illustrates a first user program instruction:

0001 Load R11, 12(R14) # Access address formed as 12+R14 (cache line 88000).
0002 Add R16, R12→R13
0003 Load R3, 24(R14) # Access 24+R14 (also in cache line at 88000)
0004 Sub R6, R7→R2
0005 Mov R3, R8 # First use of data from cache line 88000 (accesses R3)
0006 Xor R8, # 16, R8
0007 CMP R8, R11, R13

In the above example, it can be assumed that a cache miss occurs with the Load R11 instruction in line "0001" and this initiates a MAF entry for cache line 88000. When the Load R3 instruction in line "0003" is encountered a miss will also occur and is in the same cache line 88000. So a scoreboard entry will be created for the Load R3. The Mov R3 instruction in line "0005" is the first program instruction that uses either R11 or R3 and hence is the first-user program instruction in this example. However, if the Load R3 in instruction "0003" was to a different cache line than Load R11 in line "001" then the first-user program instruction would be the CMP R8, R11 in line "0007" because that is the first one to use the R11 data.

Each time a new fill is received, the source determines if the data fill in the MAF entry 160 is the same as the speculative data fill utilized by the source to continue execution. If the new fill is different, the source replaces the previous data fill with the new fill. If the subsequent data fill is different from the speculative data fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 166 has changed indicating that the coherent signal has been received. Once the coherent flag 166 changes state, the source can compare the coherent fill 164 stored in the MAF entry 160 with the speculative data fill used to continue execution of the processor to determine if execution should continue or whether the processor needs to re-execute the program instructions with the coherent data.

If the coherent data fill is different from the speculative data fill, the source can load the cache with the coherent fill, set the cache to a backup point, invalidated the cache line in a speculative cache, set the register file to the backup point via the index into the register file backup system, reset the register rename map (e.g., for an out-of-order pipeline), reload the registers based on the register scoreboard, set the program counter to the first user program instruction and re-execute program instructions with the new coherent data. If the coherent data fill is the same as the speculative data fill, the source can continue execution of program instructions and begin retiring instructions that employed the speculative data fill. Alternatively, a comparison can be performed of bytes from the speculative data fill and the coherent fill associated with register loads in the register scoreboard. If the bytes are the same, the registers have been loaded with the correct values and a backup is not necessary. If the bytes are not the same, the registers have been loaded with the incorrect values and a backup is necessary.

Figure 6:
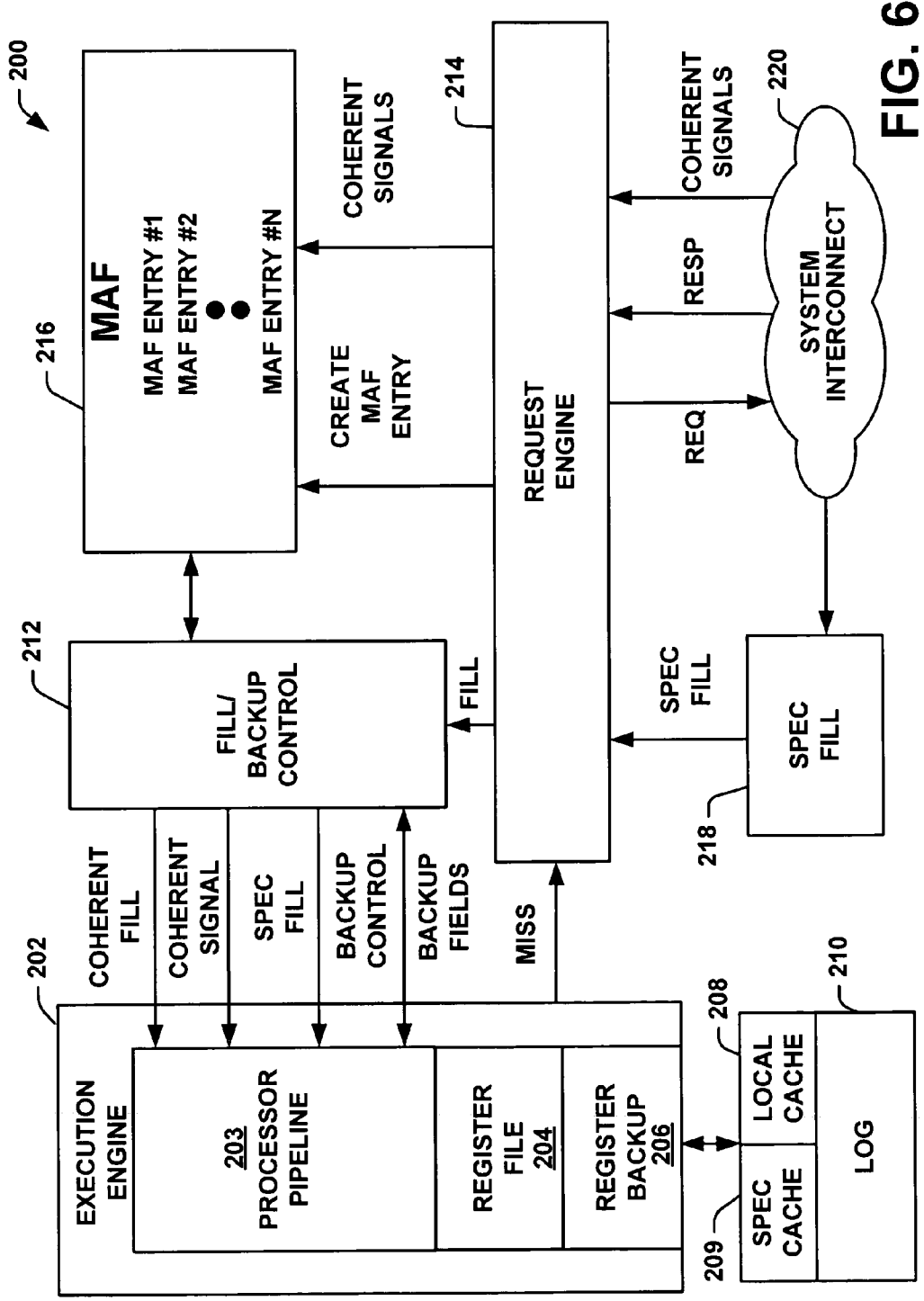
FIG. 6 depicts an example of a processor system.

FIG. 6 illustrates a processor system 200 for executing program instruction with speculative data fills in a multi-processor system. The processor system can execute program instruction with speculative data fills past memory barriers, while still maintaining memory consistency. The system 200 includes an execution engine 202 that is executing instructions associated with a processor pipeline 203. During a load or store instruction, the execution engine 202 searches a local cache 208 to determine if the cache line associated with the load or store instruction resides in the local cache 208. If the cache line does not reside in the local cache 208, the execution engine 202 initiates a cache miss to a request engine 214. The request engine 214 determines if a previous MAF entry resides in a MAF. The MAF can include N MAF entries, where N is an integer greater than or equal to one. Each MAF entry is associated with a source request for a cache line.

If a MAF entry associated with the cache line corresponding to the load or store instruction resides in the MAF 216, a previous unresolved source request has been issued over the system. If a MAF entry associated with the cache line corresponding to the load or store instruction does not reside in the MAF 216, the request engine 214 creates a new MAF entry and issues a source request over the system via a system interconnect 220. A MAF can be implemented as a table, an array, a linked list or other data structure programmed to manage and track requests for each cache line. The MAF entry includes fields that identify, for example, the address of the data being requested, the type of request, and response information received from other nodes in response to the request. The request engine 214 thus employs a MAF 216 having one or more MAF entries to manage requests issued by the request engine 214 as well as responses to such requests.

The system 200 includes a speculative cache 209 that retains cache data associated with program instructions employing data from speculative data fills, and the local cache 208, which is a retire-time cache that retains cache data associated with data from speculative data fills that have been determined to be coherent. Program instructions load and store data in the speculative cache employing at least one speculative data fill. As the coherency of data of the program instructions is resolved the program instructions can begin to retire.

The system 200 includes a log 210. The log 210 stores executed store instruction entries and executed load instruction entries. Executed store instruction entries are retired from the log when coherency associated with speculative data is resolved and data associated with the respective store instruction entry is written to the local or retire-time cache 208. Executed load instruction entries are retired when coherency associated with speculative data is resolved and data associated with the respective cache line associated with the load instruction entry is determined not to have been invalidated prior to resolving the coherency of the data (e.g. at retire time).

The MAF entry associated with a given source request also includes fields for initiating a backup of a processor pipeline 203 in the event that a speculative data fill employed by the processor pipeline 203 is determined to be non-coherent. The MAF entry includes a MAF entry live flag field. The MAF entry live flag indicates that a first user program instruction has been encountered by the processor pipeline 203. The first user program instruction is the first instruction that employs the requested data. The MAF entry also includes an index into a register file backup system 206. This index can be a pointer into a log or a register backup file associated with the state of a register file 204 at a processor execution backup point. The MAF entry also includes the address of the first user program instruction. The address of the first user program instruction can be employed to backup the program counter to the first user program instruction.

The MAF entry also includes a store merge mask entry. The store merge mask can include a bit associated with each byte of a cache line. The bit associated with a corresponding byte is set if the byte is changed by a store instruction to the speculative cache. The store merge mask is employed to generate a merged fill to store in the speculative cache 209, such that data fills that have been written to by an executed store entry are not overwritten by data from a first data fill returned in response to a source request.

A speculative data fill is provided to the request engine 214 by a speculative data fill structure 218 in response to a source request. The speculative data fill structure 218 can be a tagless relatively large cache-like structure local or remote to the system 200. If the speculative data fill structure 218 has a substantial number of entries (e.g., 32 times more entries than the local cache 208), the speculative data fill structure 218 will have relatively good accuracy and a large number of speculative data fills will be coherent. The entries in the speculative data fill structure can be obtained by monitoring cache lines transmitted over the multi-processor system.

The speculative data fill is stored in a copy of latest fill block field in the MAF entry associated with the corresponding source request via the request engine 214. A fill/backup control system 212 retrieves a copy of the speculative data fill from the MAF entry and provides the speculative data fill to the processor pipeline 203. The processor pipeline 203 employs the speculative data fill to continue execution of program instructions. As new fills are received from the system, the fill/backup control system 212 compares the new fills with the copy of latest fill block field of the MAF entry. If the new fill is different then the copy of the latest fill is overwritten with the new fill. These subsequent data fills can be ignored by the processor pipeline, until a coherent signal is received. Alternatively, if the subsequent data fill is different from the speculative data fill used by the source processor to continue execution, the processor can backup and re-execute program instructions. This may be the case if it is determined that a subsequent fill is more likely coherent than the original fill employed by the processor to continue execution.

The fill/backup control system 212 also provides an interface between the processor pipeline 203 and the MAF entry. The fill/backup control 212 analyzes the processor instructions and updates backup fields associated with the MAF entry. For example, the fill/backup control system 212 will receive backup field updates such as the address of the first user program instruction for an associated source request. The fill/backup control system 212 will store the address of the first user program instruction in the first user program instruction field and set the MAF entry live flag. The MAF entry live flag provides an indication that the first user program instruction has been encountered and that a coherent fill that does not match the speculative data fill will cause a processor execution backup to an execution state associated with the first user program instruction.

The fill/backup control system 212 monitors a coherent flag field in the MAF entry to determine if the coherent flag has changed state, which is an indication that the coherent signal has been received. Once the coherent signal is received from the system, the request engine 214 changes the state of the coherent flag field in the MAF entry.

The fill/backup control system 212 detects the change in the state of the coherent fill and retrieves a copy of the latest fill block, which corresponds to the coherent version of the data fill. The fill/backup control system 212 then compares the speculative data fill provided by the fill/backup control system 212 to the processor pipeline 203 with the coherent fill.

If the coherent data fill is different from the speculative data fill and the MAF entry live flag is set, the fill/backup control system 212 provides the coherent fill to the processor pipeline 203. The fill/backup control system 212 then resets the program counter with the first user program instruction address, sets the local cache 208 by retiring entries in the log 210 to the first user program instruction point, invalidates the cache line entry in the speculative cache, sets the register file 204 to a register file state associated with the first user program instruction via the index into the register file backup 206 and loads the new fill into the local cache 208. The processor pipeline 203 can then begin executing program instructions again with the new coherent data.

The local or retire-time cache 210, the log 210 and the speculative cache 209 allow the processor pipeline to execute program instruction past memory barriers without violating the memory consistency associated with the multi-processor system. The log retains entries associated with executed load instructions and executed store instructions. If the coherent data fill is the same as the speculative data fill, the fill/backup control system 212 provides the coherent signal to the processor pipeline 203 indicating that the processor pipeline 203 has already been provided with the coherent data. The system 200 will then begin to retire executed load instructions and executed store instructions corresponding to the coherent data, and any additional executed instructions that are a result of a cache hit within the sequence of executed instructions. As executed store instructions are retired, store data associated with the executed store instructions are written to the local or retire-time cache 208 and removed from the log 210.

As executed load instructions are retired (e.g., all prior memory reference instructions have accessed coherent data), the system 200 will specify if the cache line associated with the execution of the memory load instruction has been invalidated. If a cache line has not been invalidated, the associated executed load instruction is retired and the processor pipeline 203 can continue execution. If a cache line has been invalidated, the processor pipeline 203 is reset to a state associated with a program instruction address of the executed load instruction. As executed store instructions are retired (e.g., all prior memory reference instructions have accessed coherent data), the store data is written to the local or retire-time cache 208.

Figure 7:
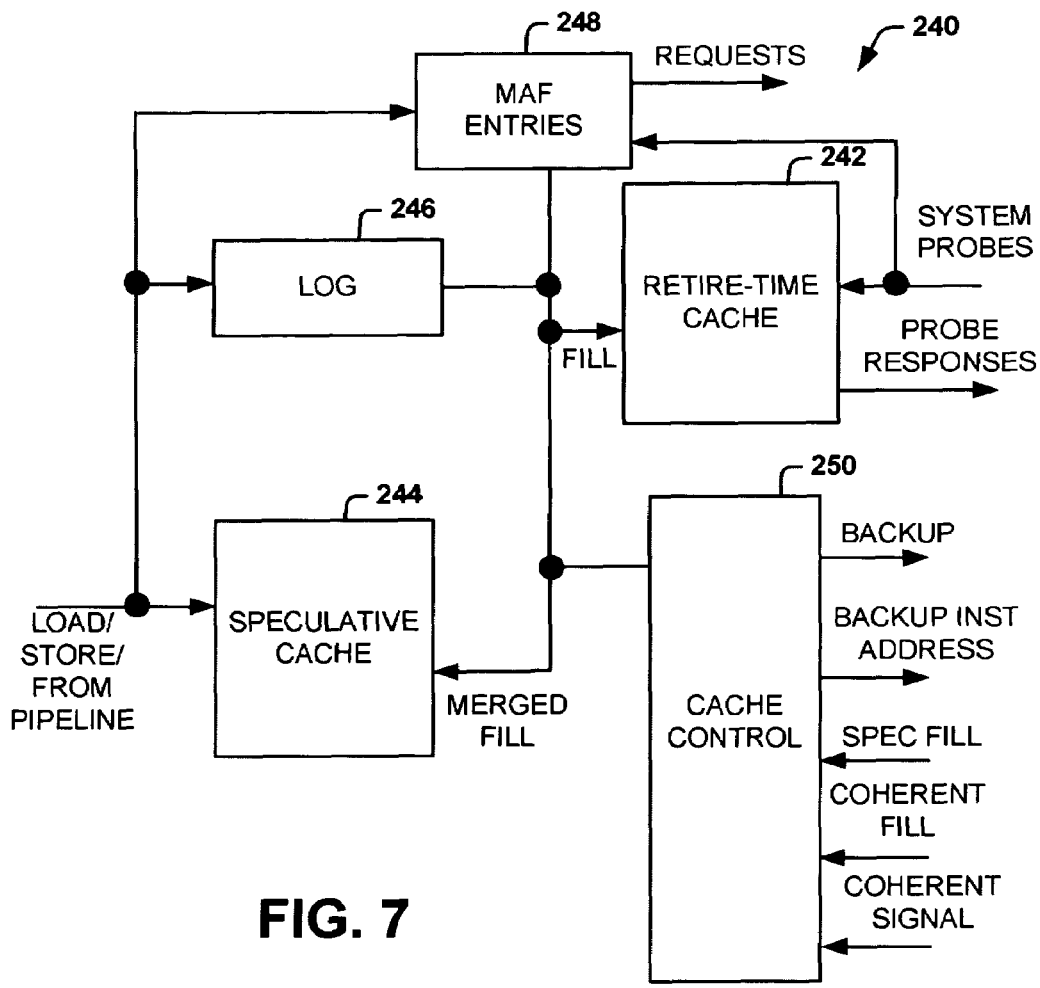
FIG. 7 illustrates a block diagram of a cache system.

FIG. 7 illustrates a cache system 240 for executing with speculative data fills that may provide for executing past memory barriers. The cache system 240 includes a speculative cache 244, a log 246 and a retire-time cache 242. A pipeline (not shown) executes program instruction with one or more speculative data fills in which executed load and store instructions employ the speculative cache 244 to read and write cache data. A source request is initiated if a load or store instruction results in a cache miss in both the speculative cache 244 and the retire-time cache 242. The source request results in the generation of a MAF entry 248, which contains information associated with tracking responses associates with the source request in addition to backup information associated with setting the processor pipeline, cache system and register file (not shown) to an execution backup point.

The source request is transmitted across a multi-processor system for a data fill associated with a cache line corresponding to the load or store instruction. A speculative data fill associated with the requested data is provided to a cache control 250. The cache control 250 loads the speculative data fill into the retire-tine cache 242. The speculative data fill is masked by a store merge mask and the non-masked bytes are written into the speculative cache 244. The store merge mask assures that bytes modified by executed stores in the speculative cache 244 are not changed by the speculative data fill. The processor pipeline continues program execution with the speculative data fill stored in the speculative cache 244. Additionally, the cache coherency protocol of the multi-processor system will return a coherent data fill and/or coherent signal to the cache control 250 that can be employed to determine the coherency of the speculative data fill. If the speculative data fill is determined to be coherent and the cache line has not been invalidated, the processor pipeline continues execution. If the speculative data fill is determined to be non-coherent or the cache line has been invalidated prior to retire time, the processor pipeline is backed up to a previous processor execution state.

Executed load entries are entered in the log 246 for each executed load instruction, and executed store entries are entered in the log 246 for each executed store instruction. The speculative cache 244 includes a plurality of cache line entries. Each cache line entry in the speculative cache 244 includes a load counter that retains a count of the number of executed load entries associated with the respective cache line that are in the log 246, and a store counter that retains a count of the number of executed store entries associated with the respective cache line that are in the log 246. The load counter is incremented as executed load entries are added to the log 246, and the load counter is decremented as executed load entries are retired and removed from the log 248 for a respective cache line entry. The store counter is incremented as executed store entries are added to the log 246, and the store counter is decremented as executed store entries are retired and removed from the log 246 for a respective cache line entry.

A cache line entry in the speculative cache 244 is protected from eviction or replacement if the cache line entry has a load or store counter greater than zero (even an invalid cache line). This mitigates load consistency problems from occurring due to evictions. Therefore, the processor pipeline will stall if the cache is full, until a cache line entry has both load and store counters equal to zero. A load or store instruction that finds an invalidated cache line entry in the speculative cache 244, but has a tag match and a load counter greater than zero will also stall the pipeline. This assures load-processing at the end of the log 246 from having to disambiguate which version of data is really in the speculative cache 244. This also keeps a subsequent version of data from being fetched.

The cache control 250 employs a store merge mask in the MAF entry 248 to determine which portions of a first data fill will be loaded into the speculative cache 244. The store merge mask includes bits for each byte of a cache line. For example, if the cache line includes 128 bytes, the store merge mask will include 128 bits with each bit being associated with a corresponding byte. A bit is set in the merge mask corresponds to a byte that has an executed store entry that has changed a byte in a cache line entry of the speculative cache 244. As a first data fill is returned from the system, the cache control 250 load the data fill into the retire-time cache 242, and merge the first data fill with the speculative mask for storing in the speculative cache 244, such that bytes that have been changed by retire-timed executed stores in the speculative cache 244 are not modified.

An executed store entry is retired from the log 246 when it is determined that all prior memory references have accessed coherent lines and the present executed store entry has been executed with coherent data. An executed store entry will be retired by examining the MAF entries 248 to determine that the corresponding line is coherent, obtaining write permission to the cache line, writing the store data into the retire-time cache 242, decrementing the store counter in the corresponding cache line entry in the speculative cache 244 and removing the store entry from the log 246.

An executed load entry is retired from the log 246 when it is determined that all prior memory references have accessed coherent lines, the present executed load entry has been executed with coherent data, and the cache line associated with the executed load instruction has not been invalidated by a system probe. An executed load entry will be retired by examining the MAF entries 248 to determine an absence of an entry for the line. If there is non entry then the data is coherent in the speculative cache. The load counter in the corresponding cache line entry in the speculative cache 244 is decremented, the invalled or invalidated flag in the corresponding cache line entry of the speculative cache 244 is checked, and if the invalled flag is not set, the load entry is removed from the log 246.

System probes access data from the retire-time cache 242 and the MAF entries 248, such that the data from the speculative cache 244 is not accessible by the multi-processor system. However, system probes make state or mode changes (e.g., M→I, S→I, M→S) to both the retire-time cache 242 and the speculative cache 244. If a system probe invalidates a cache line (e.g., as a result of a write at another processor), an invalled flag is set and a mode field is set to an invalid state in the associated cache line entry of the speculative cache 244. Additionally, the cache line in the retire-time cache 242 is invalidated. If a coherent signal is returned to the cache control 250 indicating that a speculative data fill is determined to be coherent, the associated executed store instructions and the associated executed load instructions associated with the speculative data fill will begin to retire from the log 246.

Loads executing in the pipeline that do not stall the pipeline will lookup the address tag and mode associated with the cache line entry in the speculative cache 244, employ data from the speculative cache even on a miss, increment the load counter associated with the cache line entry in the speculative cache 244, place the load information into an entry of the log 246, send the load information to the corresponding MAF entry 248 to be placed in the load scoreboard, and, on a miss, check the MAF entries 248 and initiate a source request if a MAF entry 248 for the respective cache line does not exist. Stores executing in the pipeline that do not stall the pipeline will lookup the address tag and mode associated with the cache line entry in the speculative cache 244, write data into the speculative cache 244 even on a miss, increment the store counter associated with the cache line entry in the speculative cache 244, place the store information into an entry of the log 246, send the store information to the corresponding MAF entry 248 to set the store merge mask associated with the cache line, and, on a miss, check the MAF entries 248 and initiate a source request if a MAF entry for the respective cache line does not exist. Additionally, upon allocation of a cache line entry into the speculative cache 244, the invalled flag is cleared and the mode of the cache line entry is set to match the source request made to the system.

Prior to retiring the executed load instruction from the log 246, the cache control 250 will check the associated cache line entry in the speculative cache 244 to determine if the cache line has been invalidated. If the cache line has been invalidated, the cache control 250 initiates a backup and provides a backup instruction address to the program counter of the processor pipeline, which is the address of the executed load instruction that is being retired associated with the cache line that has been invalidated. The log 246 is flushed and the load counters in the speculative cache 244 are cleared. Any cache line with store counters greater than zero is transitioned to an invalidated state or mode and all store counters are cleared. Therefore, incorrectly speculative store data is removed from the speculative cache 244. However, a coherent version of the cache line will reside in the retire-tine cache 242, such that the processor pipeline will employ the cache line in the retire-tine cache. The register file (not shown) and the retire-time cache 242 are set to a state associated with the address of the executed load instruction, and the processor pipeline re-executes program instructions from address of the executed load instruction.

If a coherent signal is returned with a coherent fill indicating that the speculative data fill associated with a store and/or load instruction is non-coherent, the cache control 250 will initiate a backup to a backup instruction address associated with a first user program instruction. Entries from the log 246 are retired to the backup instruction address, such that the retire-time cache 242 is set to a backup point associated with the first user program instruction. The remaining entries in the log 246 are flushed and the load counters in the speculative cache 244 are cleared. Any cache line with store counters greater than zero is transitioned to an invalidated state or mode and all store counters are cleared. Therefore, incorrect speculative store data is removed from the speculative cache 244. The register file (not shown) and the retire-tine cache 242 are set to a state associated with the address of the first user program instruction. The cache control 250 then loads the registers in the register scoreboard with data from the coherent fill, except registers that have a not live at first user flag set. Additionally, other MAF entries 248 are examined and any scoreboard entries or first-user program instructions occurring later than the backup point are removed for the respective MAF entries 248. The processor pipeline can then begin executing program instructions again with the new coherent data from the first user instruction address.

Figure 8:
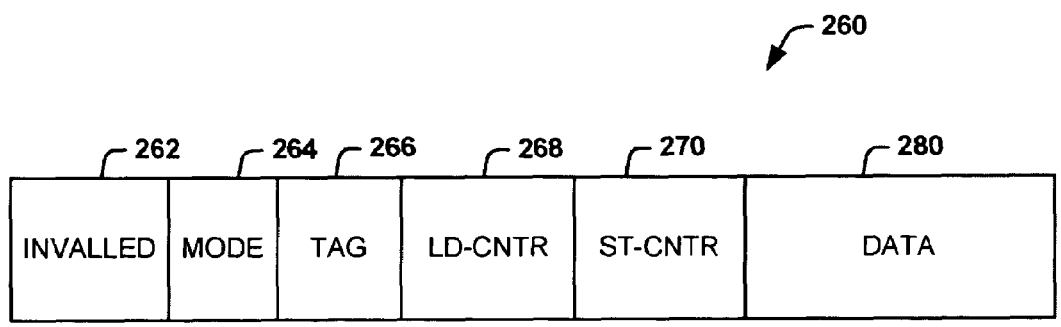
FIG. 8 illustrates a cache line entry of a speculative cache.

FIG. 8 illustrates a cache line entry 260 associated with a speculative cache. The cache line entry 260 includes an invalled flag 262, a mode or state field 264 and a tag 266 associated with the address of the cache line. The invalled flag 262 is set if a system probe has invalidated the cache line associated with the cache line entry 260. A cache line may be invalidated when another processor in the system requests write access to the cache line. The cache line entry 260 also includes a load counter 268 that maintains a count of executed load entries in the log that have not been retired. The load counter is incremented as an executed load entry is added to the log, and the load counter is decremented as an executed load entry is retired and removed from the log. The cache line entry 260 also includes a store counter 270 that maintains a count of executed store entries in the log that have not been retired. The store counter is incremented as an executed store entry is added to the log, and the store counter is decremented as an executed store entry is retired and removed from the log. The cache line entry 260 also includes a data field 280 that retains cache data associated with the cache line entry in the speculative cache.

FIG. 9 illustrates an executed store entry 300. The executed store entry 300 includes a store field 302 that specifies that the log entry is an executed store entry, an address field 304 that stores the address that the store instruction is accessing, a way field 306 that retains the way in the data cache that the cache line is located and store data 308 associated with the executed store instruction.

FIG. 10 illustrates an executed load entry 320. Each executed load entry 320 includes a load field 322 that specifies that the log entry is an executed load entry, an address field 324 that stores the address that the load instruction is accessing, and a way field 326 that retains the way in the data cache that the cache line is located. The executed load entry 320 also includes a program instruction address of the load 328. The program instruction address of the load 328 is employed to reset the program counter of the processor pipeline in the event that a cache line associated with a load has been invalidated prior to being retired. The program instruction address of the load 328 is employed to re-execute the load instruction to preserve memory consistency associated with the multi-processor system.

FIG. 11 illustrates a log 340 associated with a cache system. The log 340 includes executed load entries and executed store entries. The plurality of executed load and store entries occur in sequential order such that loads and stores are retired in a first-in-first-out (FIFO) manner. The exemplary log 340 illustrates seven total entries of executed load and store entries. A cache log index points to a backup point indicated between a fifth entry and a sixth entry. The backup point can be associated with the state of the cache at a first user program instruction, which is a first program instruction that employs data associated with a corresponding speculative data fill. If a backup occurs, executed store entries before the backup point are written to retire-time cache and store entries after the backup point are flushed from the log 340. Additionally, executed load entries before the backup point are retired if the corresponding cache line has not been invalidated. The remaining entries in the log would be flushed from the log 340 such that the retire-time cache would be at a program execution state associated with a first user program instruction corresponding to a non-coherent speculative data fill. If a cache line is invalidated during retirement of an executed load entry, the program counter instruction address of the executed load entry can be employed to reset the processor pipeline to an execution point associated with the load instruction.

Figure 12:
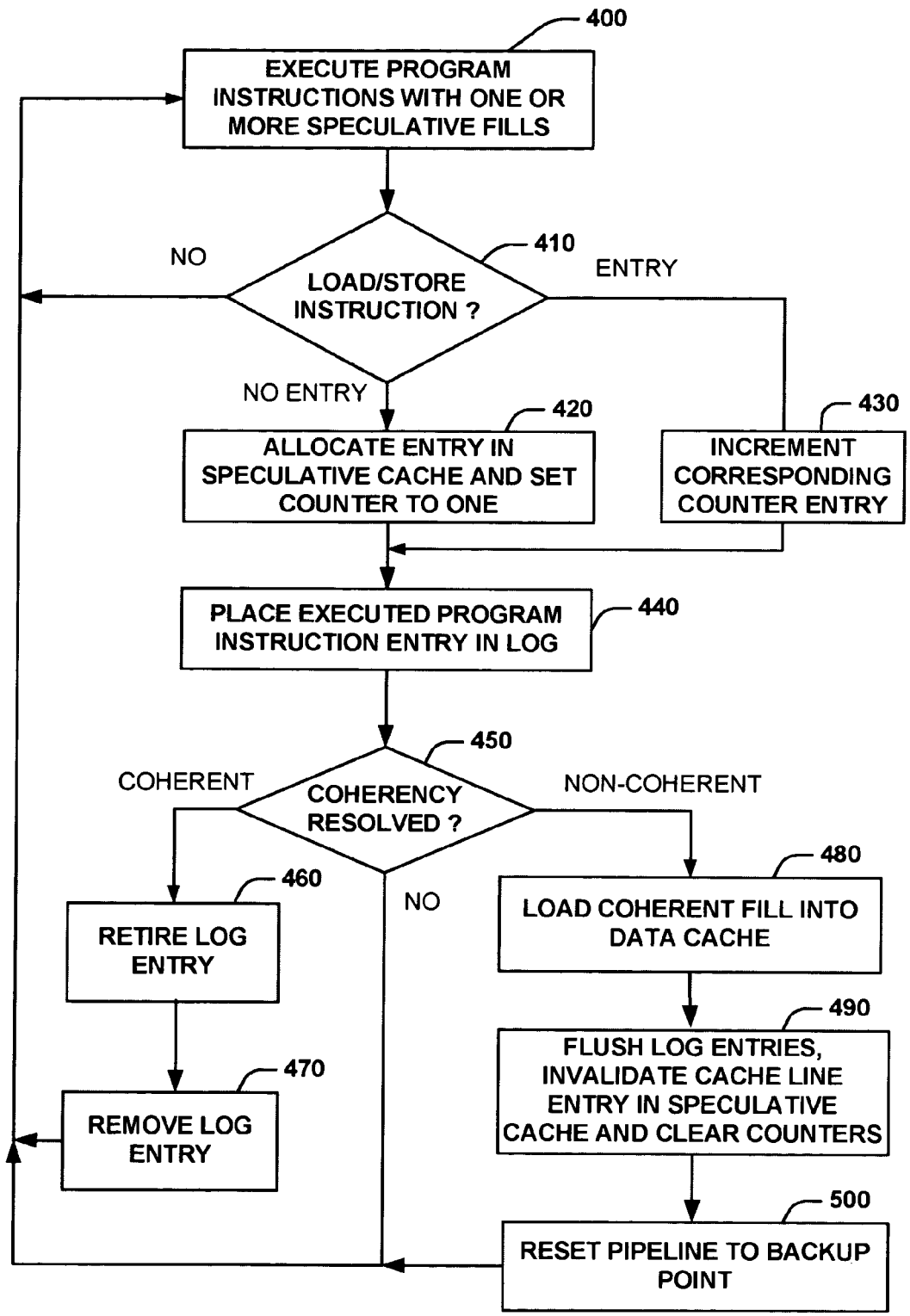
FIG. 12 depicts a method employing a speculative data fill in the event of a local cache miss in a multi-processor system.
Figure 13:
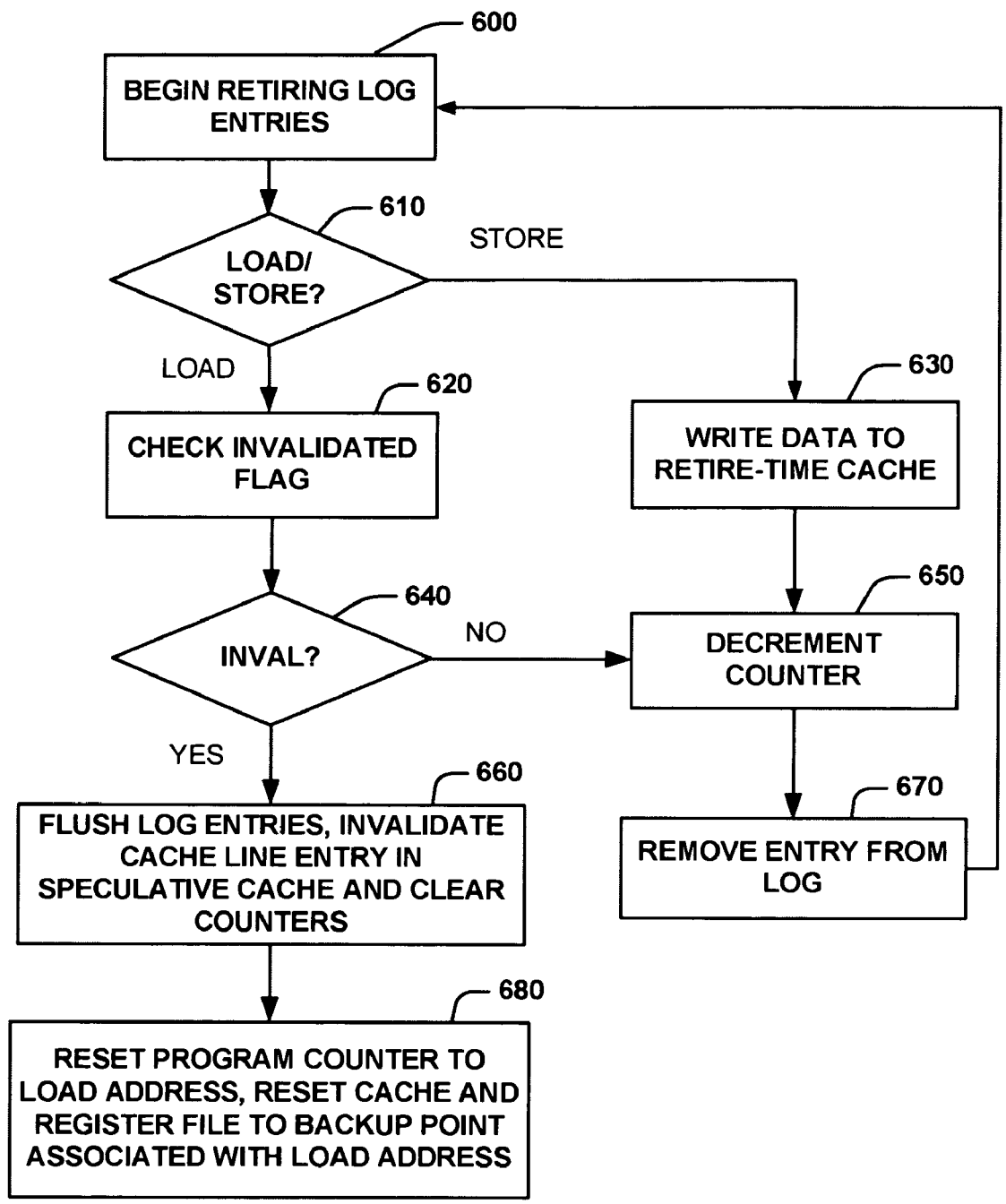
FIG. 13 depicts a method for retiring executed instructions.
Figure 14:
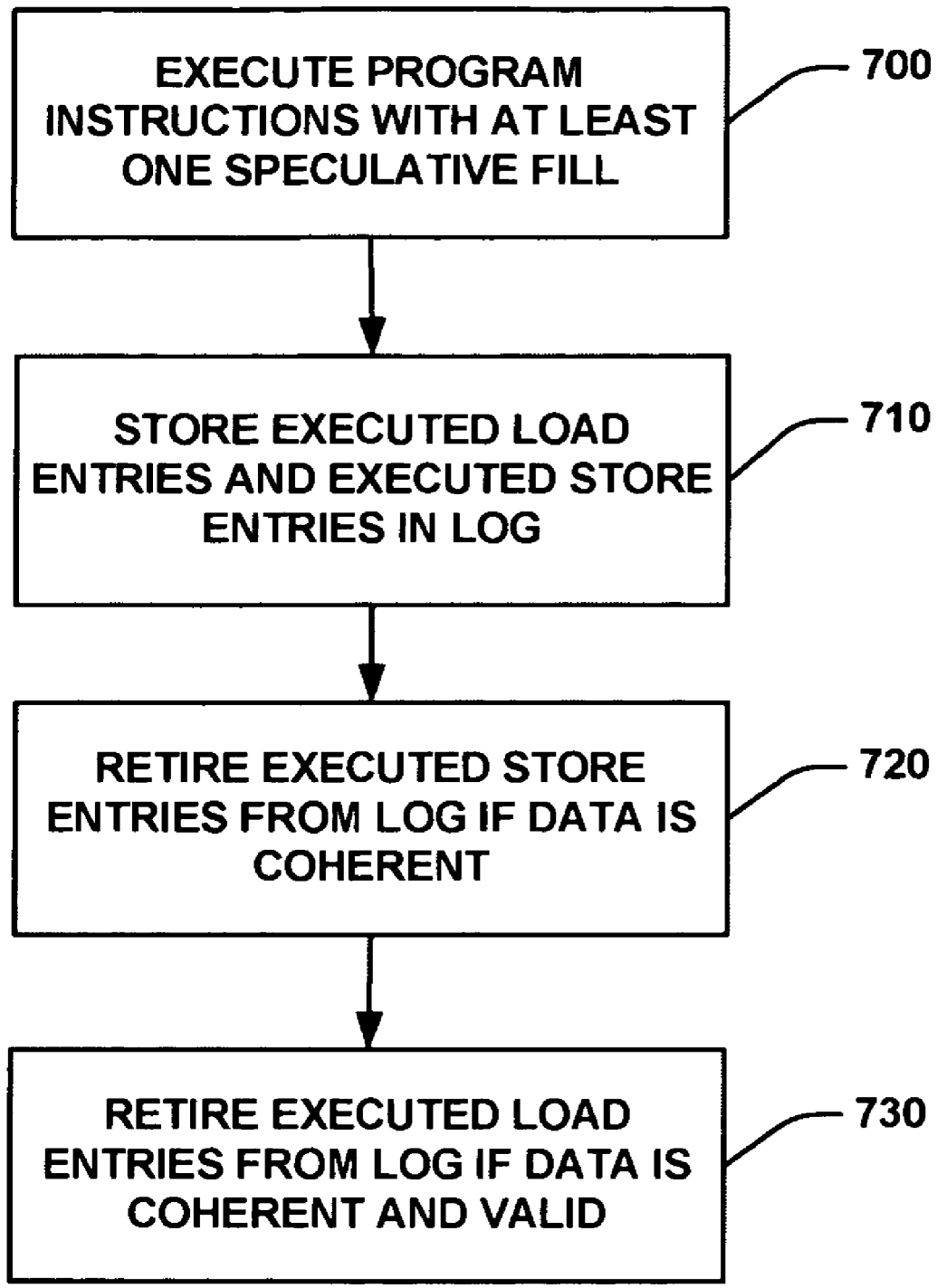
FIG. 14 depicts a flow diagram illustrating a method for executing program instructions employing a speculative data fill in a multi-processor system.

In view of the foregoing structural and functional features described above, certain methods will be better appreciated with reference to FIGS. 12-14. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 12 depicts a method employing a speculative data fill in the event of a local cache miss in a multi-processor system. At 400, program instructions are executed with one or more speculative data fills. Speculative data fills are employed when a source request is transmitted by a source node or processor in the event of a cache miss caused by a load or store instruction of a processor pipeline. The source processor can receive speculative data fills from a local processor (e.g., a member of a multi-processor group), or a remote processor (e.g., non-member of a multi-processor group). The speculative data fill can also be provided by a speculative guess structure operative to provide speculative data fills, such as a speculative engine (e.g., dedicated processor and/or memory) that returns speculative copies of cache lines. The speculative guess structure can be a storage structure local to the source processor that maintains speculative copies of cache lines in a table or some other form. The methodology then proceeds to 410.

At 410, the methodology determines if an executed load instruction or an executed store instruction has been encountered. If an executed load instruction or an executed store instruction has not been encountered (NO), the methodology returns to 400 to continue program instructions with one or more speculative data fills. If an executed load instruction or an executed store instruction has been encountered at 410, it is determined if a cache line entry exists in a speculative cache for the corresponding cache line associated with the executed load or store instruction. If a cache line entry does exist in the speculative cache (ENTRY), the methodology proceeds to 430 to increment a corresponding load or store counter in the cache line entry. If a cache line entry does not exist in the speculative cache (NO ENTRY), the methodology proceeds to 420 to allocate a new cache line entry in the speculative cache and set the corresponding load or store counter in the new allocated cache line entry to one. The methodology proceeds to 440 to place an executed load entry or an executed store entry in the log. The methodology then proceeds to 450.

At 450, coherency associated with the executed load entry or executed store entry is resolved. If the speculative data fill associated with the executed load entry or executed store entry is coherent, the methodology proceeds to 460 to begin to retire the executed load entry or the executed store entry. Retiring of an executed load entry includes determining if the cache line has been invalidated. If the cache line has been invalidated, the methodology backs up the processor pipeline to a load instruction address associated with the executed load entry and re-executes the program from the load instruction address. If the cache line has not been invalidated, the methodology retires the load instruction, removes the executed load entry from the log and decrements the load counter in the cache line entry in the speculative cache at 470. Retiring of an executed store entry includes writing the data associated with the executed store entry into a retire-time cache. The methodology retires the store instruction, removes the executed store entry from the log and decrements the store counter in the cache line entry in the speculative cache at 470. The methodology then returns to 400 to continue executing program instruction with one or more speculative data fills.

If the speculative data fill associated with the executed load entry or executed store entry is determined to be non-coherent at 450, the methodology proceeds to 480. At 480, a coherent data fill is loaded into the retire-tine cache. At 490, entries are flushed from the log and the cache line entry associated with the speculative data fill is invalidated. Invalidating of the cache line entry in the speculative cache will cause the processor pipeline to read the retire-time cache to obtain the coherent copy of the data fill. The methodology then proceeds to 500 to reset the processor pipeline to a backup point (e.g., first user program instruction). The methodology then returns to 400 to continue executing program instruction with one or more speculative data fills.

FIG. 13 depicts a method for retiring executed instructions. At 600, the methodology begins retiring executed load entries and executed store entries in the log as data associated with the executed load entries and executed store entries is determined to be coherent. At 610, the methodology determines if the entry in the log is an executed store entry or an executed load entry. If the methodology determines that the log entry is an executed store entry (STORE), the methodology proceeds to 630. At 630, data associated with the executed store entry is written into the retire-time cache. The methodology then proceeds to 650 to decrement the store counter in an associated cache line entry of a speculative cache. The methodology then proceeds to 670 to remove the executed store entry from the log. The methodology then returns to 600 to begin retiring log entries.

If the methodology determines that the log entry is an executed load entry (LOAD) at 610, the methodology proceeds to 620. At 620, an invalidated flag in a cache line entry in the speculative cache associated with the speculative data fill is checked to determine if the cache line has been invalidated. At 640, it is determined if invalidated flag is set. If the invalidated flag is not set (NO), the methodology proceeds to 650. At 650, a load counter in an associated cache line entry of a speculative cache is decremented. The methodology then proceeds to 670 to remove the executed load entry from the log. The methodology then returns to 600 to begin retiring log entries.

If the invalidated flag is set (YES) at 640, the methodology proceeds to 660. At 660, entries are flushed from the log and the cache line entry associated with the speculative data fill is invalidated. Invalidating of the cache line entry in the speculative cache will cause the processor pipeline to read the retire-tine cache to obtain the coherent copy of the data fill. Additionally, the store and load counters in the cache line entry associated with the speculative data fill are cleared. The methodology then proceeds to 680. At 680, the program counter of the processor pipeline is reset to the instruction address associated with the executed load instruction. The retire-time cache is set to a backup point state associated with the executed load instruction, and the register file is set to a backup point state associated with the executed load instruction FIG. 14 depicts a method for executing program instructions employing a speculative data fill in a multi-processor system. At 700, program instructions are executed with data from at least one speculative data fill that is provided in response to a source request. At 710, executed store entries and executed load entries are stored in a log associated with the executed program instructions. At 720, executed store entries are retired from the log if data from the speculative data fill associated with the executed store entries has been determined to be coherent. At 730, executed load entries are retired from the log if data from the speculative data fill associated with the executed load entries has been determined to be coherent and valid.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
    a processor that transmits a source request for a data fill associated with a cache line in response to a cache miss, the processor having a processor pipeline that executes program instructions with speculative data from a given speculative data fill of at least two speculative data fills received from two or more other processors of the multi-processor system in response to the source request, the speculative data fills are copies of the requested data fill and having undetermined coherency states;
    a first cache that retains cache data associated with program instructions employing speculative data from speculative data fills; and
    a second cache that retains cache data associated with data from speculative data fills that have been determined to be coherent.

2. The system of claim 1, further comprising a log that retains executed program instruction entries, the executed program instruction entries being retired if the speculative data associated with the executed program instruction entry is determined to be coherent.

3. The system of claim 2, the executed program instruction entry comprising an executed load entry that is retired if the speculative data associated with the executed load entry is determined to be coherent and a cache line associated with the executed load entry has not been invalidated.

4. The system of claim 3, further comprising a cache control that initiates a backup, to maintain memory consistency, to an associated load instruction address if the cache line associated with the executed load entry has been invalidated.

5. The system of claim 2, the executed program instruction entry comprising an executed store entry that is retired if the speculative data associated with the executed store entry is determined to be coherent, wherein the speculative data associated with the executed store entry is written to the second cache when the executed stove entry is retired.

6. The system of claim 2, wherein the first cache includes a plurality of cache line entries, each cache line entry including an invalidate flag that is set if the given cache line has been invalidated by a system probe or if a backup is initiated in the event that a speculative data fill associated with the cache line entry is determined to be non-coherent.

7. The system of claim 6, wherein each cache line entry further comprising a load counter and a store counter, the load counter is incremented as executed load entries are added to the log and decremented as executed load entries are retired from the log, and the store counter is incremented as executed store entries are added to the log and decremented as executed store entries are retired from the log.

8. The system of claim 7, wherein a cache line entry with a load counter or a store counter with a value greater than zero is prevented from being evicted or removed from the first cache.

9. The system of claim 1, further comprising a cache control that initiates a backup of the processor pipeline to a program address associated with an executed load instruction if a cache line associated with the executed load instruction has been invalidated.

10. The system of claim 1, further comprising a cache control that initiates a backup of the processor pipeline to a first user program instruction if the given speculative data fill associated with the executed program instruction is determined to be non-coherent.

11. The system of claim 1, wherein the processor pipeline stores a first data fill received from the multi-processor system in response to a source request in the second cache, and stores a merged data fill in the first cache, the merged data fill being based on a store merge mask that determines which bytes of the data fill in the first cache have been written to b an executed store entry, such that data fills that have been written to by an executed store entry are not overwritten by data from the first data fill.

12. The system of claim 11, the store merge mask comprising a bit associated with each byte of a cache line, the bit associated with a corresponding byte being set if the byte is changed by a store instruction to the first cache.

13. The system of claim 1, wherein the processor pipeline receives a coherent signal generated by the multi-processor system that provides an indication of which of a plurality of data fills received by the processor pipeline is a coherent data fill.

14. The system of claim 1, further comprising a request engine that generates a miss address file (MAF) entry associated with a source request, the MAP entry having a plurality of fields that retain backup information in the event that a backup is initiated.

15. The system of claim 14, wherein the plurality of fields comprises a store merge mask that determines which bytes of a data fill in the first cache have been written to by an executed store entry, such that data fills that have been written to by an executed store entry are not overwritten by data from a first data fill provided by the multi-processor system in response to a source request.

16. The system of claim 14, wherein the plurality of fields further comprises an index into a log of executed program instruction entries and a first user program instruction address corresponding to a first program instruction that employs the speculative data from the given speculative data fill.

17. The system of claim 1, wherein system probes from the multi-processor system receive data from the second cache and make state changes to both the first cache and the second cache.

18. A processor in a multi-processor system that conforms to a cache coherency protocol, the processor comprising:
    a processor that transmits a source request for a data fill associated with a cache line in response to a cache miss, the processor having a processor pipeline that executes program instructions with speculative data from a given speculative data fill of at least two speculative data fills received from two or more other processors of the multi-processor system in response to a source request, the speculative data fills being copies of the requested data fill that have undetermined coherency states;

a cache system comprising a speculative cache and a retire-time cache, the processor pipeline reading and writing cache data to the speculative cache;

a log that retains executed store entries and executed load entries associated with reading and writing cache data to the speculative cache; and a cache control that updates the retire-time cache with data associated with the executed store entries when the given speculative data fill is determined to be coherent.

19. The processor of claim 18, wherein the cache control retires an executed load entry if speculative data associated with the executed load entry is determined to be coherent and a cache line associated with the executed load entry has not been invalidated.

20. The processor of claim 19, wherein the cache control initiates a backup to an associated load instruction address in the executed load entry if the cache line associated with the executed load entry has been invalidated.

21. The processor of claim 20, wherein the cache control retires an executed store entry if speculative data associated with the executed store entry is determined to be coherent.

22. The processor of claim 18, wherein the speculative cache includes a plurality of cache line entries, each cache line entry including a load counter that retains a count of load instructions that have been executed but not retired and a store counter that retains a count of store instructions that have been executed but not retired, such that the load counter is incremented as executed load entries are added to the log and decremented as executed load entries are retired from the log, and the store counter is incremented as executed store entries are added to the log and decreinented as executed store entries are retired from the log.

23. The processor of claim 18, wherein the speculative cache includes a plurality of cache line entries, at least one cache line entry being invalidated in an event that a backup of program instructions is initiated.

24. The processor of claim 18, wherein the cache control initiates a backup of the processor pipeline to a first user program instruction if the given speculative data fill associated with the executed program instruction is determined to be non-coherent.

25. The processor of claim 18, further comprising a miss address file (MAF) entry associated with each source request, the MAF entry having a plurality of fields that retain backup information in the event that a backup is initiated.

26. The processor of claim 25, wherein the plurality of fields comprises a store merge mask that determines which bytes of a data fill in the speculative cache have been written to by an executed store entry, such that bytes that have been written to by an executed store entry are not overwritten by data from a first data fill returned in response to a source request.

27. The processor of claim 18, wherein the multi-processor system employs a cache coherency protocol that causes the system to generate a coherent signal that provides an indication of which of a plurality of data fills received by the processor pipeline is a coherent data fill, the processor employing the coherent signal to determine if the given speculative data fill is coherent.

28. A multi-processor system that employs a cache coherency protocol, the system comprising:

a source processor comprising:
means for transmitting a source request for a data fill associated with a cache line in response to a cache miss; and
means for executing program instructions employing speculative data from a given speculative data fill of at least two speculative data fills received from two or more other processors of the multi-processor system in response to the source request, the speculative data fills being copies of the requested data fills and having undetermined coherency states;

means for retaining cache data associated with the executed program instructions;

means for storing executed program instruction entries associated with executed program instructions;

means for retiring the executed program instruction entries if the given speculative data fill is determined to be coherent and a cache line associated with the given speculative data fill has been determined not to have been invalidated upon resolving the coherency associated with the given speculative data fill; and means for retaining cache data associated with retired executed program instructions.

29. The system of claim 28, further comprising means for setting the means for executing program instructions to a backup point if the given speculative data fill has been determined to be non-coherent and the cache line associated with the given speculative data fill has been determined to have been invalidated upon resolving the coherency associated with the given speculative data fill.

30. The system of claim 29, wherein the means for setting the means for executing program instructions to a backup point comprises setting the means for executing program instructions to a load instruction address associated with an executed load instruction which has had a cache line that has been invalidated prior to resolving the coherency associated with the given speculative data fill.

31. The system of claim 29, wherein the means for setting the means for executing program instructions to a backup point comprising setting the means for executing program instructions to a first user program instruction address if the given speculative data fill is determined to be non-coherent, the first user program instruction being the first program instruction that employs data associated with the non-coherent speculative data fill.

32. The system of claim 28, further comprising means for merging a first data fill return by the multi-processor system in response to a source request to be stored in the means for retaining cache data associated with the executed program instructions, such that bytes of data fills that have been written to by an executed store entry are not overwritten by data from the first data fill.

33. The system of claim 28, further comprising means for providing an indication of which of a plurality of data fills associated with a source request is a coherent data fill.

34. A method of executing program instructions employing a speculative data fill in a multi-processor system that conforms to a cache coherency protocol, the method comprising:

transmitting a source request for a data fill associated with a cache line in response to a cache miss;

receiving at least two speculative data fills from two or more other processors of the multi-processor system in response to the source request, the at least two speculative data fills being copies of the requested data fill and having undetermined coherency states;

executing program instructions with speculative data from a given speculative data fill of the at least two speculative data fills;

storing executed store entries and executed load entries in a log associated with the executed program instructions;

retiring executed store entries from the log, if data from the given speculative data fill has been determined to be coherent; and retiring executed load entries from the log, if the speculative data from the given speculative data fill associated with the executed load entries has been determined to be coherent and valid.

35. The method of claim 34, frrther comprising re-executing program instructions from the program instruction address associated with a respective executed load entry that has a corresponding cache line that has been invalidated.

36. The method of claim 34, further comprising re-executing program instructions from a first user program instruction address if a cache line associated with an executed program instruction has a corresponding speculative data, fill that has been determined to be non-coherent, the first user program instruction is a first program instruction that employs data from the given speculative data fill.

37. The method of claim 34, further comprising:
generating a plurality of cache line entries in a speculative cache for storing and loading cache line data associated with program execution with at least one speculative data fill;
incrementing a load counter that retains a count associated with executed load entries associated with a respective cache line that are added to the log and decrementing the load counter when executed load entries associated with a respective cache line are retired from the log; and
incrementing a store counter that retains a count associated with executed store entries associated with a respective cache line that are added to the log and decrementing the store counter when executed store entries associated with a respective cache line are retired from the log.

38. The method of claim 34, further comprising storing data associated with an executed store entry in the log in a retire-time cache when an executed store entry is retired from the log.

39. The method of claim 34, further comprising:
setting bits in a store merge mask associated with bytes of a data fill in a speculative cache that have been written to by at least one executed store entry; and
merging a first data fill received from the multi-processor system in response to a source request with the merge mask to provide a merged data fill, such that the merged data fill is stored in the speculative cache.

40. The method of claim 39, further comprising generating a miss address file (MAF) entry associated with a source request, and storing the store merge mask in a field of the MAF entry.

* * * * *

UNITED STATES PATENT AND TRADEMARK OFFICE
CERTIFICATE OF CORRECTION

| | |
|---|---|
| PATENT NO. | : 7,409,500 B2 |
| APPLICATION NO. | : 10/755938 |
| DATED | : August 5, 2008 |
| INVENTOR(S) | : Simon C. Steely, Jr. et al. |

It is certified that error appears in the above-identified patent and that said Letters Patent is hereby corrected as shown below:

In column 5, line 39, delete "alter" and insert -- after --, therefor.

In column 8, line 40, delete "tine" and insert -- time --, therefor.

In column 9, line 65, delete "tine" and insert -- time --, therefor.

In column 15, line 36, delete "retire-tine" and insert -- retire-time --, therefor.

In column 17, line 42, delete "retire-tine" and insert -- retire-time --, therefor.

In column 17, line 44, delete "retire-tine" and insert -- retire-time --, therefor.

In column 17, line 62, delete "retire-tine" and insert -- retire-time --, therefor.

In column 20, line 11, delete "retire-tine" and insert -- retire-time --, therefor.

In column 20, line 53, delete "retire-tine" and insert -- retire-time --, therefor.

In column 21, line 56, in Claim 5, delete "stove" and insert -- store --, therefor.

In column 22, line 22, in Claim 11, after "to" delete "b" and insert -- by --, therefor.

In column 22, line 38, in Claim 14, delete "MAP" and insert -- MAF --, therefor.

In column 23, line 31, in Claim 22, delete "decreinented" and insert -- decremented --, therefor.

UNITED STATES PATENT AND TRADEMARK OFFICE
CERTIFICATE OF CORRECTION

PATENT NO. : 7,409,500 B2
APPLICATION NO. : 10/755938
DATED : August 5, 2008
INVENTOR(S) : Simon C. Steely, Jr. et al.

It is certified that error appears in the above-identified patent and that said Letters Patent is hereby corrected as shown below:

In column 25, line 5, in Claim 35, delete "frrther" and insert -- further --, therefor.

In column 25, line 13, in Claim 36, after "data" delete ",".

Signed and Sealed this

Eleventh Day of November, 2008

JON W. DUDAS
*Director of the United States Patent and Trademark Office*